United States Patent
Majima et al.

(10) Patent No.: US 12,086,737 B2
(45) Date of Patent: Sep. 10, 2024

(54) INFORMATION PROVIDING SYSTEM, INFORMATION PROVIDING DEVICE, AND COMPUTER READABLE RECORDING MEDIUM

(71) Applicant: TOYOTA JIDOSHA KABUSHIKI KAISHA, Toyota (JP)

(72) Inventors: Hiroshi Majima, Tokyo (JP); Masato Endo, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 574 days.

(21) Appl. No.: 17/372,625

(22) Filed: Jul. 12, 2021

(65) Prior Publication Data

US 2022/0067593 A1 Mar. 3, 2022

(30) Foreign Application Priority Data

Aug. 27, 2020 (JP) ................................ 2020-143636

(51) Int. Cl.
  *G06Q 10/02* (2012.01)
  *G01C 21/34* (2006.01)
  *G06Q 30/0283* (2023.01)

(52) U.S. Cl.
  CPC ......... *G06Q 10/02* (2013.01); *G01C 21/3484* (2013.01); *G06Q 30/0283* (2013.01)

(58) Field of Classification Search
  CPC ............... G06Q 10/02; G06Q 30/0283; G01C 21/3484

(Continued)

(56) References Cited

U.S. PATENT DOCUMENTS

2016/0203422 A1* 7/2016 Demarchi ............... G06F 16/29
  705/6
2017/0124671 A1* 5/2017 Tam ....................... G06Q 50/14
(Continued)

FOREIGN PATENT DOCUMENTS

CN 111121799 A 5/2020
JP 2020-071107 A 5/2020
WO WO-2015024807 A1 * 2/2015 ......... G01C 21/3423

OTHER PUBLICATIONS

Roch Muraine, "Transportation 4.0: Multimodal transportation systems", May 17, 2020, technologymagazine.com, 4 pages. (Year: 2020).*

(Continued)

*Primary Examiner* — Shannon S Campbell
*Assistant Examiner* — Freda A Nelson
(74) *Attorney, Agent, or Firm* — Sughrue Mion, PLLC

(57) ABSTRACT

An information providing system includes: a server including a first processor configured to provide an excursion pass that allows a user to use a plurality of transportation units to a terminal of the user; and a terminal including a second processor configured to output predetermined information to the server. The first processor is configured to: estimate a transportation unit used by the user among the plurality of transportation units, and a usage section of the transportation unit; acquire evaluation information indicating evaluation of the user with respect to the transportation unit from the terminal; calculate allocation of sales of the excursion pass to each operator providing the plurality of transportation units based on an estimation result of the transportation unit and the usage section, and the evaluation information; and output information regarding the allocation to each operator.

27 Claims, 6 Drawing Sheets

(58) Field of Classification Search
USPC ............................................................ 705/5
See application file for complete search history.

(56) References Cited

U.S. PATENT DOCUMENTS

| | | |
|---|---|---|
| 2017/0146351 A1* | 5/2017 | von Cavallar ........ G06F 16/288 |
| 2020/0111268 A1* | 4/2020 | Montague .......... G06Q 30/0645 |
| 2020/0132480 A1 | 4/2020 | Majima et al. |
| 2020/0132499 A1 | 4/2020 | Majima et al. |
| 2020/0182637 A1* | 6/2020 | Kumar ................. G01C 21/343 |
| 2021/0224224 A1* | 7/2021 | Wakabayashi .......... H04L 63/12 |

OTHER PUBLICATIONS

Yves Crozet, Georgina Santos, Jean Coldefy, "Shared Mobility & MaaS- The Regulatory Challenges of Urban Mobilty", Sep. 2019, Cerre 2019, 82 pages. (Year: 2019).*

* cited by examiner

FIG.4 500

DEPARTURE: 8/10 14:05

EARLY ARRIVAL | LOW FEE | SMALL NUMBER OF TRANSFERS

5011 — BICYCLE SHARING
5012 — 14:05-17:11    3 HOURS 6 MINUTES
5013 — □□ LINE ×× STATION
        14:36 DEPARTURE
5014 — 🚶 > 🚲 > 🚇 > 🚇 > 🚶
5015 — NUMBER OF TRANSFERS:
        3 (10 MINUTES ON FOOT)    ¥XXXX
} 501

TAXI
14:05-17:15    3 HOURS 10 MINUTES
○○ LINE △△ STATION
14:24 DEPARTURE
🚕 > 🚇 > 🚇 > 🚇 > 🚶
NUMBER OF TRANSFERS:
3 (10 MINUTES ON FOOT)    ¥XXXX
} 502

TRAIN
14:05-17:20    3 HOURS 15 MINUTES
○○ LINE ×× STATION
14:10 DEPARTURE
🚶 > 🚇 > 🚇 > 🚇 > 🚶
NUMBER OF TRANSFERS:
3 (10 MINUTES ON FOOT)    ¥XXXX
} 503

BUS
14:05-17:21    3 HOURS 16 MINUTES
○○ LINE △△ STOP
14:09 DEPARTURE
🚶 > 🚌 > 🚇 > 🚇 > 🚇 > 🚶
NUMBER OF TRANSFERS:
4 (10 MINUTES ON FOOT)    ¥XXXX
} 504

CAR RENTAL
14:05-18:02    3 HOURS 57 MINUTES

🚶 > 🚗
NUMBER OF TRANSFERS:
0 (0 MINUTES ON FOOT)    ¥XXXX
} 505

CAR SHARING
14:05-18:02    3 HOURS 57 MINUTES

🚶 > 🚗
NUMBER OF TRANSFERS:
0 (0 MINUTES ON FOOT)    ¥XXXX
} 506

CAR
14:05-18:02    3 HOURS 47 MINUTES

🚗
NUMBER OF TRANSFERS:
0 (0 MINUTES ON FOOT)    ¥XXXX
} 507

BICYCLE
14:05-21:28    7 HOURS 23 MINUTES

🚲
NUMBER OF TRANSFERS:
0 (0 MINUTES ON FOOT)    ¥0
} 508

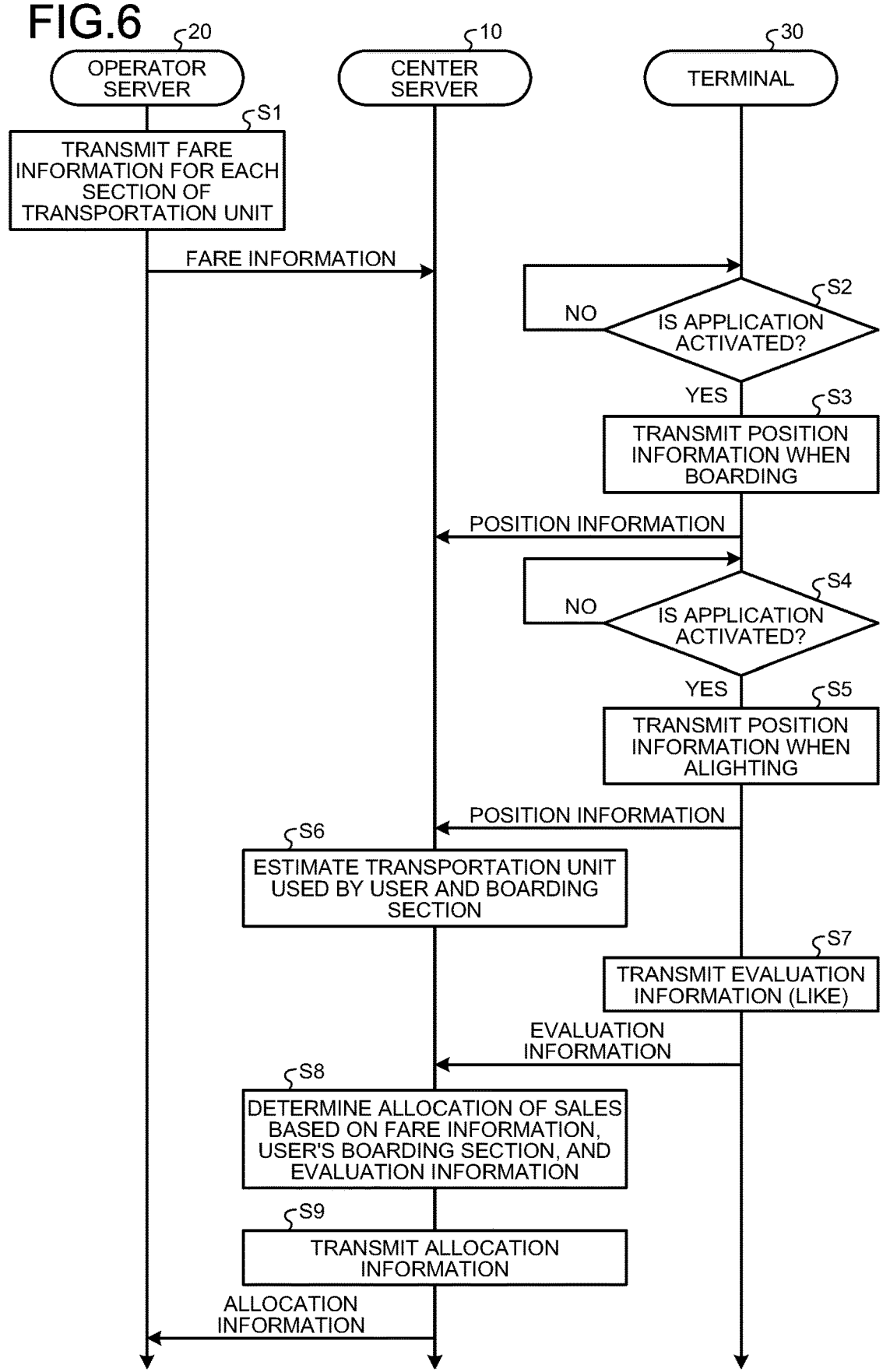

INFORMATION PROVIDING SYSTEM, INFORMATION PROVIDING DEVICE, AND COMPUTER READABLE RECORDING MEDIUM

The present application claims priority to and incorporates by reference the entire contents of Japanese Patent Application No. 2020-143636 filed in Japan on Aug. 27, 2020.

BACKGROUND

The present disclosure relates to an information providing system, an information providing device, and a computer readable recording medium.

A ticket across a plurality of transportation operators (railroad, subway, bus, ship, and the like) (hereinafter referred to as an excursion pass) is known (see, for example, JP 2020-071107 A).

SUMMARY

In a service using an excursion pass, for example, a user's usage history (which transportation unit has been used and how much it has been used) is collected, and the service of the transportation unit provided by each transportation operator (hereinafter referred to as "operator") is evaluated based on this usage history. However, when the service of the transportation unit provided by each operator is evaluated only from the records such as the user's usage history, it is not possible to obtain feedback in terms of quality from each user, so that the service quality may not be improved.

There is a need for an information providing system, an information providing device, and a computer readable recording medium that improve the service quality of the operator that provides the excursion pass.

According to one aspect of the present disclosure, there is provided an information providing system including: a server including a first processor configured to provide an excursion pass that allows a user to use a plurality of transportation units to a terminal of the user; and a terminal including a second processor configured to output predetermined information to the server, wherein the first processor is configured to: estimate a transportation unit used by the user among the plurality of transportation units, and a usage section of the transportation unit; acquire evaluation information indicating evaluation of the user with respect to the transportation unit from the terminal; calculate allocation of sales of the excursion pass to each operator providing the plurality of transportation units based on an estimation result of the transportation unit and the usage section, and the evaluation information; and output information regarding the allocation to each operator.

BRIEF DESCRIPTION OF THE DRAWINGS

FIG. 4 is a diagram illustrating an example of a route search result display screen to be displayed on a terminal in the information providing system according to the embodiment;

FIG. 6 is a flowchart illustrating an example of an information providing method executed by the information providing system according to the embodiment.

DETAILED DESCRIPTION

The information providing device according to the embodiment of the present disclosure will be described with reference to the drawings. Note that the components in the embodiment described below include those that may be easily replaced by those skilled in the art or those that are substantially the same.

Figure 1:
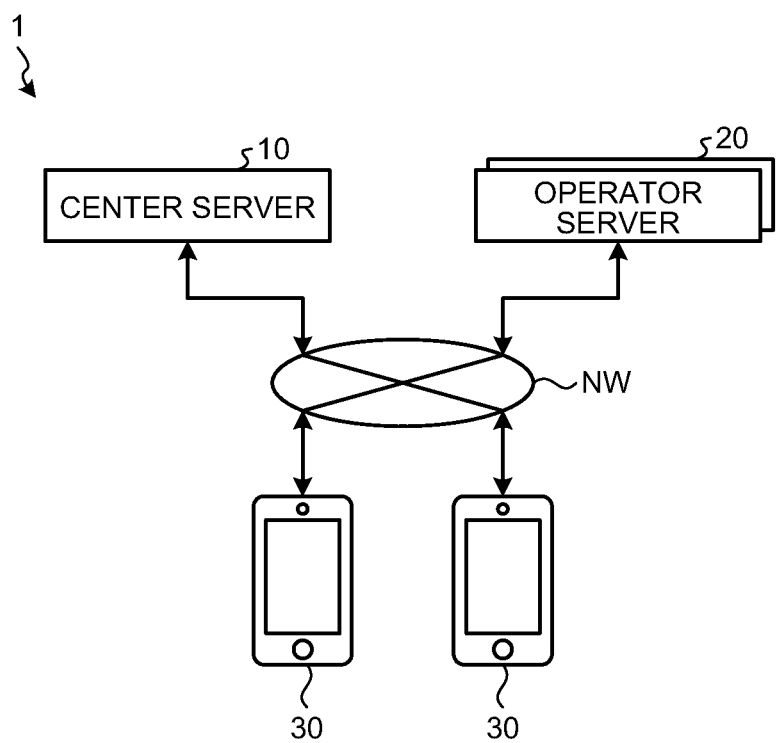
FIG. 1 is a schematic diagram illustrating an overall configuration of an information providing system according to an embodiment.

The information providing system including the information providing device according to the embodiment will be described with reference to FIGS. 1 to 5. As illustrated in FIG. 1, an information providing system 1 includes a center server 10, a plurality of operator servers 20, and a plurality of terminals 30. The information providing device according to the embodiment is realized by the function of the center server 10 of the information providing system 1. The center server 10, the operator servers 20, and the terminals 30 all have a communication function, and are configured to be able to communicate with each other through a network NW. This network NW includes, for example, an Internet network, a mobile phone network, and the like.

The center server 10 is for providing predetermined information to the terminal 30 owned by the user and the operator server 20 that provides a transportation unit. Specifically, the center server 10 performs multimodal route search from the starting point to the destination by combining one or more of a plurality of transportation units such as automobiles, walking, bicycles, and public transportation facilities, and provides the route search result to the terminal 30. Further, the center server 10 provides the terminal 30 with an excursion pass that may use a plurality of transportation units. Moreover, the center server 10 provides the operator server 20 with information regarding the allocation of sales (revenue) of the excursion pass used by the user. The center server 10 is realized by a workstation or a general-purpose computer such as a personal computer.

Figure 2:
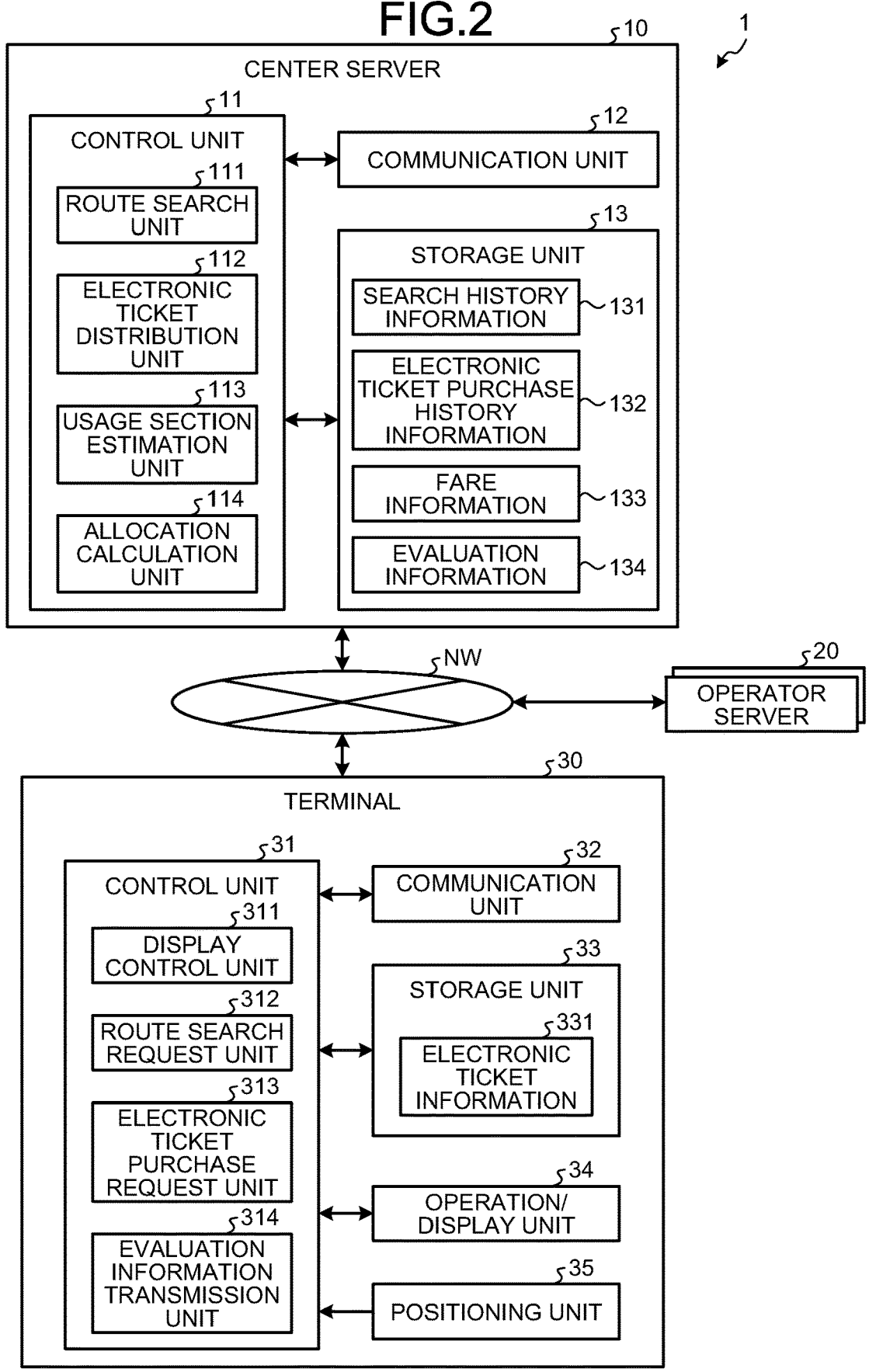
FIG. 2 is a block diagram illustrating details of each component of the information providing system according to the embodiment.

As illustrated in FIG. 2, the center server 10 includes a control unit (first processor) 11, a communication unit 12, and a storage unit 13. Specifically, the control unit 11 includes a processor including a central processing unit (CPU), a digital signal processor (DSP), and a field-programmable gate array (FPGA), and a memory (main storage unit) including a random access memory (RAM) and a read only memory (ROM).

The control unit 11 loads a program stored in the storage unit 13 into a work area of the main storage unit and executes it, and controls each constituent unit or the like through the execution of the program to realize a function that meets a predetermined purpose. The control unit 11 functions as a route search unit 111, an electronic ticket distribution unit 112, a usage section estimation unit 113, and an allocation calculation unit 114 through the execution of the program stored in the storage unit 13.

The route search unit 111 performs a multimodal route search by combining a plurality of transportation units by communicating with the plurality of operator servers 20 based on a route search request acquired from the terminal 30. Then, the route search unit 111 transmits the result of the route search to the terminal 30 and stores it in the storage unit 13 as search history information 131.

At the time of route search, the route search unit 111 may search for a route that uses the transportation unit that matches the user's preference based on the evaluation information of the transportation unit acquired in advance from the terminal 30. That is, when it may be determined that the user prefers or supports a specific transportation unit based on the user's evaluation information stored so far, the route using such transportation unit is preferentially searched, and the result of the route search is transmitted to the terminal 30. Note that the details of the "evaluation information" will be described later. In this way, the convenience of the user may be improved by performing the route search in consideration of the evaluation of the transportation unit from the user.

Further, at the time of route search, the route search unit 111 may search for a route passing through a facility that matches the user's preference based on the evaluation information with respect to the facility acquired in advance from the terminal 30. That is, when it may be determined that the user prefers or supports a specific facility based on the user's evaluation information stored so far, the route passing through such facility is preferentially searched, and the result of the route search is transmitted to the terminal 30. In this way, the convenience of the user may be improved by performing the route search in consideration of the evaluation of the facility from the user.

Figure 3:
FIG. 3 is a diagram illustrating an example of a route search condition input screen to be displayed on a terminal in the information providing system according to the embodiment.

Here, FIG. 3 illustrates an example of a route search condition input screen 400 displayed on an operation/display unit 34 of the terminal 30 when the route search unit 111 performs route search. Further, FIG. 4 illustrates an example of a route search result display screen 500 displayed on the operation/display unit 34 of the terminal 30 when the route search unit 111 performs route search.

The input screen 400 of FIG. 3 is displayed on the operation/display unit 34 when, for example, in a route search application installed on the terminal 30, a route search button 401 of the menu at the bottom in the drawing is pressed (for example, a touch operation on the corresponding position of the operation/display unit 34). The input screen 400 includes a starting point box 402, a destination box 403, a waypoint box 404, a stay time setting menu 405, a departure time setting menu 406, a map display area 407, and a route search execution button 408.

The starting point box 402 is for setting the starting point in the multimodal route search. In the starting point box 402, for example, the current position of the terminal 30 detected by a positioning unit 35 of the terminal 30 is set as a default setting.

The destination box 403 is for setting the starting point in the multimodal route search. The waypoint box 404 is for setting a waypoint in the multimodal route search. The stay time setting menu 405 is for setting the stay time at a waypoint in the multimodal route search. The departure time setting menu 406 is for setting the departure time from the starting point in the multimodal route search.

In the map display area 407, a map image of the area including the starting point, the destination, and the waypoint set in the starting point box 402, the destination box 403, and the waypoint box 404 is displayed. The route search execution button 408 is for causing the route search unit 111 to execute the multimodal route search according to the contents set in the starting point box 402, the destination box 403, the waypoint box 404, the stay time setting menu 405, and the departure time setting menu 406. When the route search execution button 408 is pressed by the user, a route search request is transmitted from the terminal 30 to the center server 10. Then, the route search unit 111 performs route search based on the route search request.

On the input screen 400 of FIG. 3, when the route search execution button 408 is pressed by the user and then the route search result is sent from the route search unit 111 to the terminal 30, the screen transitions to the display screen 500 illustrated in FIG. 4. Route candidate display areas 501 to 508 corresponding to a plurality of route candidates are displayed on the display screen 500.

The route candidate display areas 501 to 508 include, for example, a display field 5011 for displaying typical transportation units included in the route candidates, a display field 5012 for displaying the transportation time, a display field 5013 for displaying a boarding station and an alighting station of public transportation facilities, a display field 5014 for displaying the symbol mark of each transportation unit, a display field 5015 for displaying the number of times of transfer and the walking time, and the like.

The electronic ticket distribution unit 112 distributes an electronic ticket to the terminal 30. This "electronic ticket" is an electronic version of a paper ticket issued by the operator. Further, the electronic ticket in the present embodiment assumes an excursion pass that allows free use of a plurality of transportation facilities (railroad, subway, bus, ship, and the like) within a predetermined period and within a predetermined area (see FIG. 5).

Specifically, when the electronic ticket distribution unit 112 acquires an electronic ticket purchase request from the terminal 30, the electronic ticket distribution unit 112 generates electronic ticket information based on the purchase request. Then, the electronic ticket distribution unit 112 transmits the generated electronic ticket information to the terminal 30. Further, the electronic ticket distribution unit 112 stores the information regarding the sold electronic ticket in the storage unit 13 as electronic ticket purchase history information 132.

Note that payment of the electronic ticket may be performed, for example, in the information providing system 1 or may be performed through an external payment system (for example, a financial institution). When the payment of the electronic ticket is performed in the information providing system 1, the payment is performed at the same time when the electronic ticket is purchased through an electronic ticket application installed on the terminal 30. Then, when the electronic ticket purchase request is transmitted from the terminal 30 to the center server 10, electronic ticket payment completion information is also transmitted at the same time. Further, when the payment of the electronic ticket is performed through the external payment system, the electronic ticket payment completion information is transmitted from the external payment system to the center server 10 separately from the electronic ticket purchase request transmitted from the terminal 30.

The usage section estimation unit 113 estimates the transportation unit used by the user among the plurality of transportation units provided by the operators, and the usage section of the transportation unit. The usage section estimation unit 113 may estimate the transportation unit and the usage section based on the user's position information acquired from the terminal 30. In this case, the user's position information is acquired by a GPS sensor (positioning unit 35) mounted on the terminal 30, or acquired when the communication unit 32 of the terminal 30 communicates with another device via short-range wireless communication (for example, wireless fidelity (Wi-Fi) (registered trademark) or Bluetooth (registered trademark) low energy (BLE)). By acquiring the user's position information from the terminal 30 in this way, it is possible to easily estimate which section of which transportation unit the user has used.

When, for example, the user's position information at the usage start point of a certain transportation unit and the user's position information at the usage end point of the transportation unit are acquired from the terminal 30, the usage section estimation unit 113 may estimate that the user has used the transportation unit in the section between the usage start point and the usage end point. That is, the usage section estimation unit 113 estimates the transportation unit operating between the usage start point and the usage end point as the transportation unit used by the user. Further, the usage section estimation unit 113 estimates the section between the usage start point and the usage end point as the usage section of the transportation unit. In this way, by using the user's position information detected at the two points: the usage start point (for example, the boarding station) and the usage end point (for example, the alighting station), it is possible to accurately estimate which section of which transportation unit the user has used.

Further, for example, when the user's position information at the usage start point of a first transportation unit and the user's position information at the usage start point of a second transportation unit connected after the first transportation unit are acquired from the terminal 30, the usage section estimation unit 113 may estimate the user's position at the usage end point of the first transportation unit from the user's position information at the usage start point of the second transportation unit. That is, when the user has used a plurality of transportation units (first transportation unit and second transportation unit) and only the position information at the time of boarding these transportation units may be acquired, the alighting position (e.g., alighting station) of the preceding, first transportation unit is estimated by using the information of the boarding position (e.g., boarding station) of the second transportation unit connected after the first transportation unit.

For example, it is assumed that "subway A" is the first transportation unit, and "subway B" connected after subway A is the second transportation unit. In this case, the usage section estimation unit 113 uses the position information when the user boards at station X of subway A and the position information when the user boards at station Y of subway B, and estimates, for example, that station Z of subway A to which the user may transfer from station Y of subway B is the user's alighting station of subway A. That is, the usage section estimation unit 113 estimates that the user has used subway A (first transportation unit) in the section between station X, which is the usage start point (boarding station) of the user, and station Z, which is the estimated usage end point (alighting station). In this way, by estimating the position of the usage end point (for example, the alighting station) of the first transportation unit from the position of the usage start point (for example, the boarding station) of the second transportation unit, it is possible to estimate which section of which transportation unit the user has used by using only the position information of the usage start point.

Further, for example, when the user's position information at the usage end point of the first transportation unit and the user's position information at the usage end point of the second transportation unit connected before the first transportation unit are acquired from the terminal 30, the usage section estimation unit 113 may estimate the user's position at the usage start point of the first transportation unit from the user's position information at the usage end point of the second transportation unit. That is, when the user has used a plurality of transportation units (first transportation unit and second transportation unit) and only the position information at the time of alighting from these transportation units may be acquired, the boarding position (e.g., boarding station) of the preceding, first transportation unit is estimated by using the information of the alighting position (e.g., alighting station) of the second transportation unit connected before the first transportation unit.

For example, it is assumed that "subway A" is the first transportation unit, and "subway B" connected before subway A is the second transportation unit. In this case, the usage section estimation unit 113 uses the position information when the user alights at station X of subway A and the position information when the user alights at station Y of subway B, and, for example, estimates that station Z of subway A to which the user may transfer from station Y of subway B is the user's boarding station of subway A. That is, the usage section estimation unit 113 estimates that the user has used subway A (first transportation unit) in the section between station Z, which is the estimated usage start point (boarding station), and station X, which is the usage end point (alighting station). In this way, by estimating the position of the usage start point (for example, the boarding station) of the first transportation unit from the position of the usage end point (for example, the alighting station) of the second transportation unit, it is possible to estimate which section of which transportation unit the user has used by using only the position information of the usage end point.

The allocation calculation unit 114 calculates the allocation of the sales of the excursion pass to each operator that provides the plurality of transportation units based on the estimation result of the usage section estimation unit 113 and evaluation information 134 acquired from the terminal 30. Then, the allocation calculation unit 114 transmits the calculated allocation information to the operator server 20 managed by each operator.

The allocation calculation unit 114 acquires the evaluation information 134 from the terminal 30 in advance and stores it in the storage unit 13. The evaluation information 134 is information indicating the user's evaluation with respect to the transportation unit or the facility visited by using the transportation unit. That is, the evaluation information 134 means user feedback with respect to the service quality of the transportation unit or the facility. The evaluation information includes, for example, an evaluation with respect to the transportation unit used by the user, information regarding the basis of the evaluation with respect to the transportation unit, an evaluation with respect to the facility visited by the user using the transportation unit, and the like.

Examples of the evaluation with respect to the transportation unit used by the user include "like" indicating the intention to like or support a specific transportation unit, and a graded evaluation (five-grade evaluation, or the like) for each transportation unit. Further, the basis of evaluation with respect to the transportation unit used by the user include positive impressions such as "empty", "seats are vacant", "a lot of luggage may be put", and "good scenery".

Examples of the evaluation with respect to a facility visited by the user using the transportation unit include "like" indicating the intention to like or support a specific facility (e.g., amusement parks, museums, aquariums, hot springs, theaters, sports facilities, and the like), and a graded evaluation (five-grade evaluation, or the like) for such facility.

The allocation calculation unit 114 may calculate the allocation of the sales of the excursion pass to each operator based on, for example, the estimation result of the transportation unit and the usage section in the usage section estimation unit 113, a fare predetermined for each usage section, and the evaluation information 134. In this case, the allocation calculation unit 114 calculates the allocation of the sales of each operator with respect to the total sales of the excursion pass in consideration of the usage record of each user regarding transportation units and sections for which the excursion pass may be used, the fare (fare information 133) predetermined by each operator for each section of the transportation unit, and the evaluation information 134. Thus, it is possible to determine the allocation of sales of the excursion pass by taking into consideration not only the usage record of each user and the fare determined by each operator, but also the user's evaluation with respect to the transportation unit.

Further, the allocation calculation unit 114 may calculate the allocation of the sales of the excursion pass to each operator based on the estimation result of the transportation unit and the usage section in the usage section estimation unit 113, the distance of the usage section, i.e., the length of the section used by the user, and the evaluation information 134. In this case, the allocation calculation unit 114 calculates the allocation of the sales of each operator with respect to the total sales of the excursion pass in consideration of the usage record of each user regarding transportation units and sections for which the excursion pass may be used, the usage distance converted from the usage section of each user included in the usage record, and the evaluation information 134. Thus, it is possible to determine the allocation of sales of the excursion pass by taking into consideration not only the usage record of each user and the usage distance (boarding distance) of each user, but also the user's evaluation with respect to the transportation unit.

Further, the allocation calculation unit 114 may calculate the allocation of the sales of the excursion pass to each operator based on the estimation result of the transportation unit and the usage section in the usage section estimation unit 113, the usage time of the transportation unit, and the evaluation information 134. In this case, the allocation calculation unit 114 calculates the allocation of the sales of each operator with respect to the total sales of the excursion pass in consideration of the usage record of each user regarding transportation units and sections for which the excursion pass may be used, the usage time (e.g., boarding time) of the transportation unit, and the evaluation information 134. Thus, it is possible to determine the allocation of sales of the excursion pass by taking into consideration not only the usage record of each user and the usage time (boarding time) of each user, but also the user's evaluation with respect to the transportation unit.

Further, the allocation calculation unit 114 may calculate the allocation of the sales of the excursion pass to each operator based on the estimation result of the transportation unit and the usage section in the usage section estimation unit 113, the distance of the usage section, the usage time of the transportation unit, and the evaluation information 134. Thus, it is possible to determine the allocation of sales of the excursion pass by taking into consideration not only the usage record of each user, the usage distance (boarding distance) of each user, and the usage time (boarding time) of each user, but also the user's evaluation with respect to the transportation unit.

The communication unit 12 includes, for example, a local area network (LAN) interface board, a wireless communication circuit for wireless communication, and the like. The communication unit 12 is connected to the network NW such as the Internet, which is a public communication network. Then, the communication unit 12 communicates with the operator server 20 and the terminal 30 by connecting to the network NW.

The storage unit 13 includes a recording medium such as an erasable programmable ROM (EPROM), a hard disk drive (HDD), and a removable medium. Examples of the removable medium include disc recording media such as universal serial bus (USB) memory, compact disc (CD), digital versatile disc (DVD), and Blu-ray (registered trademark) disc (BD). The storage unit 13 may store an operating system (OS), various programs, various tables, various databases, and the like.

The storage unit 13 stores the search history information 131, the electronic ticket purchase history information 132, the fare information 133, and the evaluation information 134.

The search history information 131 is information indicating the history of the route search performed by the route search unit 111. The search history information 131 includes, for example, a route search condition, a route search result, and the like for each user (terminal 30).

The electronic ticket purchase history information 132 includes, for example, information such as the user who purchased the electronic ticket, the purchase date and time of the electronic ticket by the user, the number of purchases, the purchase amount, the expiration date, and the ticket type (adult or child).

The fare information 133 is information regarding the fare of the transportation unit predetermined by each operator (for example, railroad, subway, bus, ship, and the like). Examples of the fare information 133 include the base fare, the additional fare for each usage distance, the additional fare for each usage time, and the fare for each usage section (for example, between stations, between stops, and the like). The evaluation information 134 is information indicating the user's evaluation with respect to the transportation unit or the facility visited by using the transportation unit, and is acquired in advance from the terminal 30 at a predetermined timing.

The operator server 20 is a server managed by an operator that provides a transportation unit used for multimodal route search. This center server 10 is realized by a workstation or a general-purpose computer such as a personal computer.

The servers that constitute the operator server 20 include, for example, route bus-related servers, railroad-related servers, highway bus-related servers, aviation-related servers, ship-related servers, taxi-related servers, ride-sharing-related servers, car-sharing-related servers, rental car-related servers, and bicycle-sharing-related servers.

The route bus-related server is operated by a route bus operating company or the like, and provides information regarding the operation of the route bus (for example, timetable, operation status including delays, current position of each vehicle, and the like) to the center server 10. Further, the railroad-related server is operated by a railroad operating company or the like, and provides information regarding the operation of the railroad (for example, timetable, operation status including delays, availability of each train that may be reserved, and the like) to the center server 10. Further, the highway bus-related server is operated by a highway bus operating company or the like, and provides information regarding the operation of the highway bus (for example, timetable, operation status including delays, availability of each vehicle, and the like) to the center server 10. Further, the aviation-related server is operated by an airplane operating company or the like, and provides information regarding the operation of the airplane (for example, timetable, operation status including delays, availability of each flight, and the like) to the center server 10.

Further, the ship-related server is operated by a ship operating company or the like, and provides information regarding the operation of the ship (for example, timetable, operation status including delays, availability of each service that may be reserved, and the like) to the center server 10. Further, the taxi-related server is operated by a taxi service providing company or the like, and provides various information regarding the service of the taxi (for example, position information of each vehicle, operation status including vacant/occupied, and the like) to the center server 10. Further, the ride-sharing-related server is operated by a ride-sharing service providing company or the like, and provides various information regarding the service of ride sharing (for example, current position of each vehicle operated by ride sharing, whether a vehicle may be allocated, and the like) to the center server 10. Further, the car-sharing-related server is operated by a car-sharing service providing company or the like, and provides various information regarding the service of car sharing (for example, the number of parking spaces at each station that provides shared cars, the number of currently available cars, the number of returnable cars, and the like) to the center server 10.

Further, the rental car-related server is operated by a rental car service providing company or the like, and provides various information regarding the service of rental car (for example, the vehicle types that may be prepared at each business office that rents a car, the number of currently preparable cars of each car type at each business office, and the like) to the center server 10. Further, the bicycle-sharing-related server is operated by a bicycle-sharing service providing company or the like, and provides various information regarding the service of bicycle sharing (for example, the number of bicycles that may be provided at each of a plurality of bicycle ports that provides shared bicycles, the number of currently available bicycles, and the like) to the center server 10. In this way, the center server 10 performs the multimodal route search based on the information provided from each server constituting the operator server 20.

The operator server 20 acquires information regarding the allocation of the sales of the excursion pass from the allocation calculation unit 114 of the center server 10. Then, each operator that manages the operator server 20 receives the distribution of the sales of the excursion pass according to the above-mentioned allocation.

Terminal

The terminal 30 is for transmitting (outputting) predetermined information to the center server 10. The terminal 30 transmits, for example, a route search request, position information detected by the positioning unit 35 of the terminal 30, and the like to the center server 10. Further, the terminal 30 displays the electronic ticket information acquired from the center server 10, the result of the route search, and the like on the operation/display unit 34. The terminal 30 is realized by, for example, a smartphone, a mobile phone, a tablet terminal, a wearable computer, or the like owned by the user.

As illustrated in FIG. 2, the terminal 30 includes a control unit (second processor) 31, the communication unit 32, a storage unit 33, the operation/display unit (display) 34, and the positioning unit 35. The control unit 31 functions as a display control unit 311, a route search request unit 312, an electronic ticket purchase request unit 313, and an evaluation information transmission unit 314 through the execution of the program stored in the storage unit 33.

The display control unit 311 controls the display on the operation/display unit 34. The display control unit 311 causes the operation/display unit 34 to display, for example, the route search condition input screen 400 (see FIG. 3), the route search result display screen 500 (see FIG. 5), and an electronic ticket face screen 600 (see FIG. 5).

Figure 5:
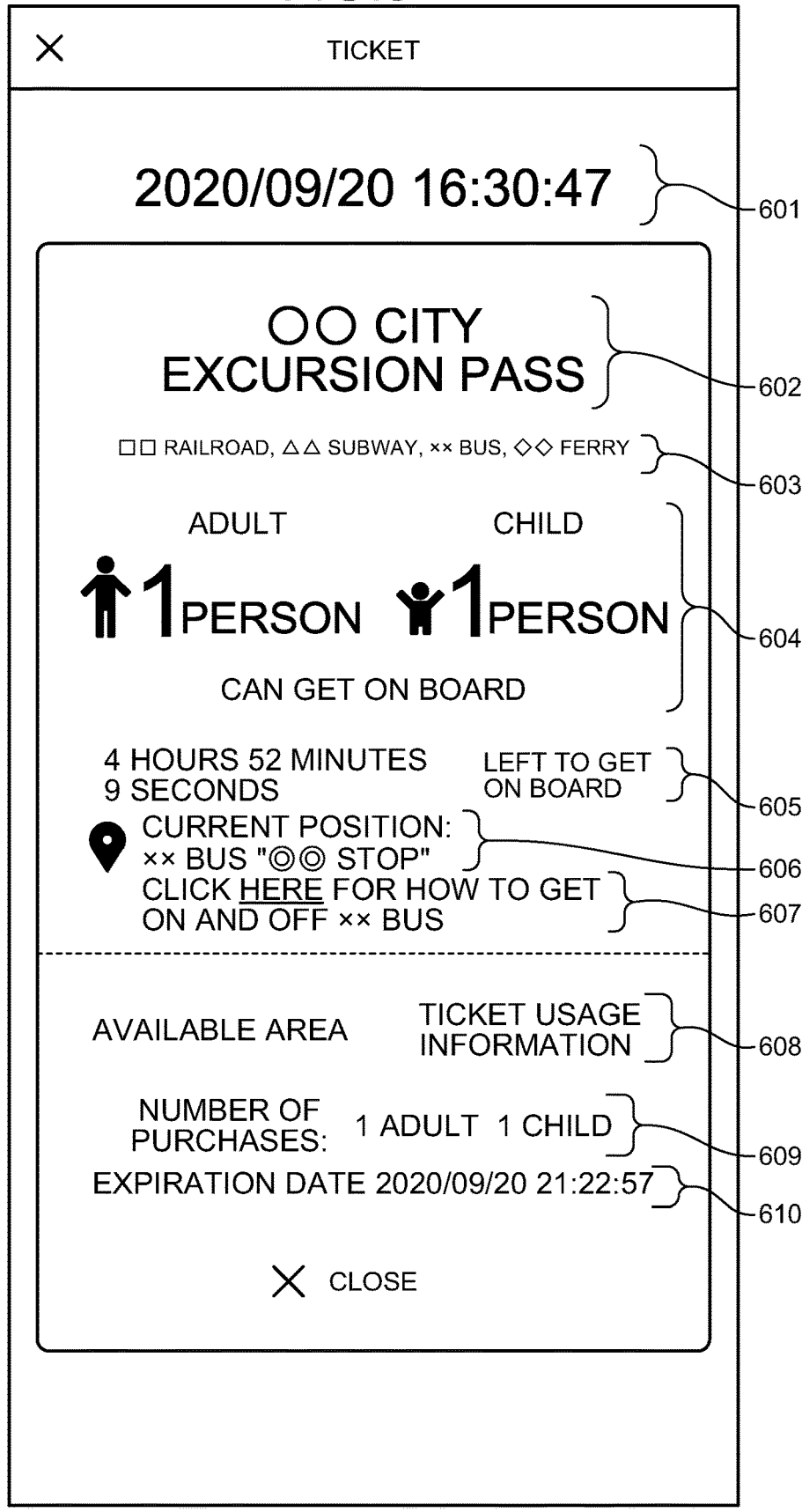
FIG. 5 is a diagram illustrating an example of an electronic ticket corresponding to an excursion pass displayed on a terminal in the information providing system according to the embodiment.

The electronic ticket face screen 600 illustrated in FIG. 5 includes an area 601 for displaying the current time, an area 602 for displaying the title of the electronic ticket, an area 603 for displaying the operator for which the electronic ticket may be used, an area 604 for displaying the ticket type (adult or child) of the electronic ticket, areas 605 and 610 for displaying the expiration date of the electronic ticket, an area 606 for displaying the user's current position, an area 607 for displaying a method of using a transportation unit to be used, an area 608 for displaying the area where the electronic ticket may be used and usage guidance, and an area 609 for displaying the number of purchases.

The route search request unit 312 transmits a route search request to the center server 10 in response to a user operation. Specifically, when the route search execution button 408 on the route search condition input screen 400 (see FIG. 3) is pressed by the user, the route search request unit 312 transmits a route search request based on the input content to the center server 10.

The electronic ticket purchase request unit 313 transmits the electronic ticket purchase request to the center server 10 in response to a user operation. Then, when the electronic ticket purchase request unit 313 acquires the electronic ticket information from the center server 10, the electronic ticket purchase request unit 313 stores the information as electronic ticket information 331 in the storage unit 33.

The evaluation information transmission unit 314 transmits the evaluation information 134 to the center server 10. The evaluation information transmission unit 314 creates the evaluation information 134 when the user's evaluation with respect to the transportation unit or the facility is input through the electronic ticket application installed on the terminal 30. Then, the evaluation information transmission unit 314 transmits the created evaluation information 134 to the center server 10. Note that the timing at which the evaluation information transmission unit 314 transmits the evaluation information 134 to the center server 10 is not particularly limited. For example, the evaluation information 134 may be transmitted sequentially from the terminal 30 side or may be transmitted at a timing determined by the terminal 30 side or the center server 10 side.

The communication unit 32 communicates with the center server 10 by wireless communication via the network NW. Further, the communication unit 32 may also perform short-range wireless communication such as Wi-Fi and BLE with another device. The storage unit 33 stores the electronic ticket information 331.

The electronic ticket information 331 is information regarding the electronic ticket purchased by the user and includes, for example, information such as the purchase date and time of the electronic ticket, the number of purchases, the purchase amount, the expiration date, and the ticket type (adult or child). Note that the storage unit 33 stores, for example, in addition to the electronic ticket information 331, application programs (route search application and electronic ticket application) for realizing the display control unit 311, the route search request unit 312, the electronic ticket purchase request unit 313, and the evaluation information transmission unit 314.

The operation/display unit 34 includes, for example, a touch panel display or the like, and has an input function for receiving an operation by a user's finger or a pen, and a display function for displaying various information based on the control of the display control unit 311. The operation/display unit 34 displays the route search condition input screen 400 (see FIG. 3), the route search result display screen 500 (see FIG. 4), the electronic ticket information (see FIG. 5), an electronic ticket purchase screen, and the like based on the control of the display control unit 311

The positioning unit 35 receives radio waves from a global positioning system (GPS) satellite and detects the information regarding the current position of the terminal 30 (hereinafter referred to as "position information"). The method for detecting the position information is not limited to the method using GPS satellites, and may use, for example, a method combining light detection and ranging or laser imaging detection and ranging (LiDAR) and a three-dimensional digital map, or the like.

The positioning unit 35 detects the position information when the user activates the electronic ticket application and the electronic ticket information (see FIG. 5) of the excursion pass is displayed on the operation/display unit 34, and transmits the detected position information to the control unit 31. Note that the situation in which the user activates the electronic ticket application includes, for example, a situation in which an electronic ticket is presented to a crew member when the user boards the transportation unit or when the user alights from the transportation unit. In this way, by acquiring the position information only when the user activates the electronic ticket application, it is possible to reduce the processing load of the terminal 30 as compared with the case where the position information is constantly acquired.

An example of the processing procedure of the information providing method executed by the information providing system 1 according to the embodiment will be described with reference to FIG. 6. In the drawing, an example of the case is described in which the position information when the user boards the transportation unit (usage start point) and the position information when the user alights from the transportation unit (usage end point) are acquired, and the allocation of the sales of the excursion pass is determined based on these pieces of information, the fare information 133, and the evaluation information 134.

First, the operator server 20 transmits the fare information 133 for each section of each transportation unit to the center server 10 (Step S1). Subsequently, the display control unit 311 of the terminal 30 determines whether or not the electronic ticket application is activated (Step S2). In Step S2, it is determined whether or not the electronic ticket application is activated in order to present the electronic ticket to the crew member, for example, when the user boards the transportation unit.

When it is determined that the electronic ticket application has not been activated (No in Step S2), the display control unit 311 returns to Step S2. On the other hand, when it is determined that the electronic ticket application has been activated (Yes in Step S2), the display control unit 311 transmits the user's position information when boarding the transportation unit detected by the positioning unit 35 to the center server 10 (Step S3).

Subsequently, the display control unit 311 of the terminal 30 determines whether or not the electronic ticket application is activated (Step S4). In Step S4, it is determined whether or not the electronic ticket application is activated in order to present the electronic ticket to the crew member, for example, when the user alights from the transportation unit.

When it is determined that the electronic ticket application has not been activated (No in Step S4), the display control unit 311 returns to Step S4. On the other hand, when it is determined that the electronic ticket application has been activated (Yes in Step S4), the display control unit 311 transmits the user's position information when alighting from the transportation unit detected by the positioning unit 35 to the center server 10 (Step S5).

Subsequently, the usage section estimation unit 113 estimates the transportation unit used by the user and the boarding section based on the user's position information when boarding the transportation unit and the user's position information when alighting from the transportation unit (Step S6). Subsequently, the evaluation information transmission unit 314 transmits the evaluation information 134 to the center server 10 (Step S7).

Subsequently, the allocation calculation unit 114 determines (calculates) the allocation of the sales of the excursion pass (allocation for each operator) based on the fare information 133, the boarding section of the user, and the evaluation information 134 (Step S8), and transmits the information regarding the determined allocation to the operator server 20 (Step S9). Thus, the present processing is completed.

As described above, with the information providing system, the information providing device, and the information providing program according to the embodiment, since the allocation of the sales of the excursion pass is determined in consideration of the user's feedback with respect to the service of the transportation unit, the service quality of the operator providing the excursion pass may be improved.

For example, with the information providing system, the information providing device, and the information providing program according to the embodiment, the estimation of the transportation unit used by the user and the usage section and the calculation of the allocation of the sales of the excursion pass are performed on the center server 10 side, but these pieces of processing may be performed on the terminal 30 side. Thus, the processing load on the center server 10 side may be reduced.

According to the present disclosure, since the allocation of the sales of the excursion pass is determined in consideration of the user's feedback with respect to the service of the transportation unit, the service quality of the operator providing the excursion pass may be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing system comprising:
    a server comprising:
        a first processor configured to provide an excursion pass to a terminal of a user that allows the user to use a plurality of transportation units; and the terminal comprising:
  a second processor configured to:
    activate an electronic ticket application in the terminal based on an action by the user;
    based upon the electronic ticket application being activated, detect position information of the user by receiving radio waves from a global positioning system (GPS), wherein the position information is only detected when the electronic ticket application is activated so as to reduce processing load of the terminal;
    transmit the position information to the server, wherein
the first processor is configured to:
  determine (i) a transportation unit used by the user among the plurality of transportation units, and (ii) a usage section of the transportation unit, based on the position information transmitted from the second processor,
  wherein based upon (a) the position information of the user at a usage end point of a first transportation unit and (b) the position information of the user at a usage end point of a second transportation unit connected before the first transportation unit, being transmitted from the terminal, the first processor is configured to:
  estimate a position of the user at a usage start point of the first transportation unit based on the position information of the user at the usage end point of the second transportation unit; and
  estimate that the user has used the first transportation unit in a section between the estimated usage start point of the first transportation unit that was estimated based on the usage end point of the second transportation unit, and the usage end point of the first transportation unit that was based on the position information transmitted from the terminal;
  acquire evaluation information from the terminal indicating an evaluation by the user with respect to each of the first transportation unit and the second transportation unit;
  calculate allocation of sales of the excursion pass to each operator providing the plurality of transportation units based on the estimation result of the first transportation unit and the second transportation unit, the usage section of the first transportation unit, and the evaluation information of the first transportation unit and the second transportation unit; and
  output information regarding the allocation to each operator.

2. The information providing system according to claim 1, wherein
  the evaluation information includes the evaluation by the user with respect to the first transportation unit and the second transportation unit, and information regarding basis of the evaluation, and
  the first processor is configured to:
    perform a multimodal route search by combining at least one of the plurality of transportation units based on a request from the terminal;
    search for a route using a transportation unit that matches a preference of the user based on the evaluation information during the route search; and
    output a result of the route search to the terminal.

3. The information providing system according to claim 1, wherein
  the evaluation information includes the evaluation by the user with respect to a facility visited by using the first transportation unit and the second transportation unit, and
  the first processor is configured to:
    perform a multimodal route search by combining one or more of the plurality of transportation units based on a request from the terminal;
    search for a route passing through a facility that matches a preference of the user based on the evaluation information during the route search; and
    output a result of the route search to the terminal.

4. The information providing system according to claim 1, wherein the position information of the user is acquired by a GPS sensor mounted on the terminal.

5. The information providing system according to claim 1, wherein
  the second processor is configured to display information of the excursion pass acquired from the server on a display provided on the terminal, and
  the information of the excursion pass is displayed on the display when the electronic ticket application is activated.

6. The information providing system according to claim 1, wherein the first processor is configured to calculate allocation of sales of the excursion pass to each operator providing the plurality of transportation units based on an estimation result of the transportation unit and the usage section, a fare predetermined for the usage section, and the evaluation information.

7. The information providing system according to claim 1, wherein the first processor is configured to calculate allocation of sales of the excursion pass to each operator providing the plurality of transportation units based on an estimation result of the transportation unit and the usage section, a distance of the usage section, and the evaluation information.

8. The information providing system according to claim 1, wherein the first processor is configured to calculate allocation of sales of the excursion pass to each operator providing the plurality of transportation units based on an estimation result of the transportation unit and the usage section, usage time of the transportation unit, and the evaluation information.

9. The information providing system according to claim 1, wherein the first processor is configured to calculate allocation of sales of the excursion pass to each operator providing the plurality of transportation units based on an estimation result of the transportation unit and the usage section, a distance of the usage section, usage time of the transportation unit, and the evaluation information.

10. An information providing device comprising
  a processor configured to provide an excursion pass to a terminal of a user that allows the user to use a plurality of transportation units, the processor being configured to:
    activate an electronic ticket application in the terminal based on an action by the user;
    based upon the electronic ticket application being activated, use a global positioning sensor to detect position information of the user by receiving radio waves from a global positioning system, wherein the position information is only detected when the electronic ticket application is activated so as to reduce processing load of the terminal;

determine (i) a transportation unit used by the user among the plurality of transportation units, and (ii) a usage section of the transportation unit, based on the position information;

wherein based upon (a) the position information of the user at a usage end point of a first transportation unit and (b) the position information of the user at a usage end point of a second transportation unit connected before the first transportation unit, being transmitted from the terminal:

estimate a position of the user at a usage start point of the first transportation unit based on the position information of the user at the usage end point of the second transportation unit; and estimate that the user has used the first transportation unit in a section between the estimated usage start point of the first transportation unit that was estimated based on the usage end point of the second transportation unit, and the usage end point of the first transportation unit that was based on the position information transmitted from the terminal;

acquire evaluation information from the terminal indicating an evaluation of by the user with respect to each of the first transportation unit and the second transportation unit;

calculate allocation of sales of the excursion pass to each operator providing the plurality of transportation units based on the estimation result of the first transportation unit and the second transportation unit, the usage section of the first transportation unit, and the evaluation information of the first transportation unit and the second transportation unit; and output information regarding the allocation to each operator.

11. The information providing device according to claim 10, wherein the evaluation information includes the evaluation by the user with respect to the first transportation unit and the second transportation unit, and information regarding basis of the evaluation, and the processor is configured to:

perform a multimodal route search by combining one or more of the plurality of transportation units based on a request from the terminal;

search for a route using a transportation unit that matches a preference of the user based on the evaluation information during the route search; and output a result of the route search to the terminal.

12. The information providing device according to claim 10, wherein the evaluation information includes the evaluation by the user with respect to a facility visited by using the first transportation unit and the second transportation unit, and the processor is configured to:

perform a multimodal route search by combining one or more of the plurality of transportation units based on a request from the terminal;

search for a route passing through a facility that matches a preference of the user based on the evaluation information during the route search; and output a result of the route search to the terminal.

13. The information providing device according to claim 10, wherein the global positioning sensor is mounted on the terminal.

14. The information providing device according to claim 10, wherein information of the excursion pass is displayed on a display provided on the terminal when the electronic ticket application is activated.

15. The information providing device according to claim 12, wherein the processor is configured to calculate allocation of sales of the excursion pass to each operator providing the plurality of transportation units based on an estimation result of the transportation unit and the usage section, a fare predetermined for the usage section, and the evaluation information.

16. The information providing device according to claim 12, wherein the processor is configured to calculate allocation of sales of the excursion pass to each operator providing the plurality of transportation units based on an estimation result of the transportation unit and the usage section, a distance of the usage section, and the evaluation information.

17. The information providing device according to claim 12, wherein the processor is configured to calculate allocation of sales of the excursion pass to each operator providing the plurality of transportation units based on an estimation result of the transportation unit and the usage section, usage time of the transportation unit, and the evaluation information.

18. The information providing device according to claim 12, wherein the processor is configured to calculate allocation of sales of the excursion pass to each operator providing the plurality of transportation units based on an estimation result of the transportation unit and the usage section, a distance of the usage section, usage time of the transportation unit, and the evaluation information.

19. A non-transitory computer-readable recording medium on which an executable program is recorded, the program causing a processor of a computer to execute:

providing an excursion pass to a terminal of a user that allows the user to use a plurality of transportation units;

activating an electronic ticket application in the terminal based on an action by the user;

based upon the electronic ticket application being activated, using a global positioning sensor to detect position information of the user by receiving radio waves from a global positioning system, wherein the position information is only detected when the electronic ticket application is activated so as to reduce processing load of the terminal;

determining (i) a transportation unit used by the user among the plurality of transportation units, and (ii) a usage section of the transportation unit, based on the position information;

wherein based upon (a) the position information of the user at a usage end point of a first transportation unit and (b) the position information of the user at a usage end point of a second transportation unit connected before the first transportation unit, being transmitted from the terminal:

estimating a position of the user at a usage start point of the first transportation unit based on the position information of the user at the usage end point of the second transportation unit; and estimating that the user has used the first transportation unit in a section between the estimated usage start point of the first transportation unit that was estimated based on the usage end point of the second transportation unit, and the usage end point of the first transportation unit that was based on the position information transmitted from the terminal;

acquiring evaluation information from the terminal indicating an evaluation by the user with respect to each of the transportation unit and the second transportation unit;

calculating allocation of sales of the excursion pass to each operator providing the plurality of transportation units based on the estimation result of the first transportation unit and the second transportation unit, the usage section of the second transportation unit, and the evaluation information of the first transportation unit and the second transportation unit; and outputting information regarding the allocation to each operator.

20. The non-transitory computer-readable recording medium according to claim 19, wherein the evaluation information includes the evaluation of by the user with respect to the first transportation unit and the second transportation unit, and information regarding basis of the evaluation, and the program causes the processor to execute:

performing a multimodal route search by combining one or more of the plurality of transportation units based on a request from the terminal;

searching for a route using a transportation unit that matches a preference of the user based on the evaluation information during the route search; and outputting a result of the route search to the terminal.

21. The non-transitory computer-readable recording medium according to claim 19, wherein the evaluation information includes the evaluation of by the user with respect to a facility visited by using the first transportation unit and the second transportation unit, and the program causes the processor to execute:

performing a multimodal route search by combining one or more of the plurality of transportation units based on a request from the terminal;

searching for a route passing through a facility that matches a preference of the user based on the evaluation information during the route search; and outputting a result of the route search to the terminal.

22. The non-transitory computer-readable recording medium according to claim 19, wherein the global positioning sensor is mounted on the terminal.

23. The non-transitory computer-readable recording medium according to claim 21, wherein information of the excursion pass is displayed on a display provided on the terminal when the electronic ticket application is activated.

24. The non-transitory computer-readable recording medium according to claim 21, wherein the program causes the processor to execute calculating allocation of sales of the excursion pass to each operator providing the plurality of transportation units based on an estimation result of the transportation unit and the usage section, a fare predetermined for the usage section, and the evaluation information.

25. The non-transitory computer-readable recording medium according to claim 21, wherein the program causes the processor to execute calculating allocation of sales of the excursion pass to each operator providing the plurality of transportation units based on an estimation result of the transportation unit and the usage section, a distance of the usage section, and the evaluation information.

26. The non-transitory computer-readable recording medium according to claim 21, wherein the program causes the processor to execute calculating allocation of sales of the excursion pass to each operator providing the plurality of transportation units based on an estimation result of the transportation unit and the usage section, usage time of the transportation unit, and the evaluation information.

27. The non-transitory computer-readable recording medium according to claim 21, wherein the program causes the processor to execute calculating allocation of sales of the excursion pass to each operator providing the plurality of transportation units based on an estimation result of the transportation unit and the usage section, a distance of the usage section, usage time of the transportation unit, and the evaluation information.

* * * * *